(12) United States Patent
Neuberth

(10) Patent No.: US 10,215,240 B2
(45) Date of Patent: Feb. 26, 2019

(54) METHOD FOR REDUCING LOW-FREQUENCY VIBRATIONS IN THE DRIVE TRAIN OF A MOTOR VEHICLE

(71) Applicant: Schaeffler Technologies AG & Co. KG, Herzogenaurach (DE)

(72) Inventor: Ulrich Neuberth, Otigheim (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 280 days.

(21) Appl. No.: 15/119,910

(22) PCT Filed: Mar. 26, 2015

(86) PCT No.: PCT/DE2015/200196
§ 371 (c)(1),
(2) Date: Aug. 18, 2016

(87) PCT Pub. No.: WO2015/158343
PCT Pub. Date: Oct. 22, 2015

(65) Prior Publication Data
US 2017/0108060 A1    Apr. 20, 2017

(30) Foreign Application Priority Data

Apr. 16, 2014  (DE) .......................... 10 2014 207 310
Apr. 16, 2014  (DE) .......................... 10 2014 207 354
(Continued)

(51) Int. Cl.
*F16D 48/06*  (2006.01)

(52) U.S. Cl.
CPC ........ *F16D 48/06* (2013.01); *F16D 2500/102* (2013.01); *F16D 2500/1045* (2013.01);
(Continued)

(58) Field of Classification Search
CPC ............... F16D 48/06; F16D 2500/102; F16D 250/50293; F16D 2500/70605;
(Continued)

(56) References Cited

U.S. PATENT DOCUMENTS 5,638,267 A *  6/1997  Singhose ................. G05B 5/01
                                                    700/28
6,494,046 B1 * 12/2002  Hayess .................... F01D 21/00
                                                    60/39.091
(Continued)

FOREIGN PATENT DOCUMENTS

DE         4009200        9/1991
DE        19907454        8/2000
(Continued)

*Primary Examiner* — Edwin A Young
(74) *Attorney, Agent, or Firm* — Volpe and Koenig, P.C.

(57) ABSTRACT

The invention relates to a method for reducing occasionally occurring vibrations, in particular chatter vibrations of a unit controlled automatically by an actuator, in particular a clutch actuator, on the basis of a target torque assigned to a clutch torque that is to be transmitted, in particular a target clutch torque, in particular a unit located in a drivetrain of a motor vehicle between a combustion engine and a transmission, in particular a friction clutch having an actual present clutch torque which is marked by vibrations as a result of occasionally occurring vibrations, wherein from an input signal which is representative of the vibration-marked torque on the basis of a known transfer behavior of the actual present torque vibration components of known form with unknown prefactors are continuously ascertained, a phase-correct correction torque is determined from these, and the target torque is corrected using the latter. In order to be able to separate a plurality of vibration components from one another and resolve them, an estimation model is made the basis of the input signal, and by means of the estimation (Continued)

model the prefactors are determined on the basis of a recursive method of the smallest square errors.

10 Claims, 1 Drawing Sheet

(30) Foreign Application Priority Data

| | | |
|---|---|---|
| Apr. 16, 2014 | (DE) | 10 2014 207 361 |
| Apr. 25, 2014 | (DE) | 10 2014 207 833 |
| Jul. 15, 2014 | (DE) | 10 2014 213 703 |
| Jul. 17, 2014 | (DE) | 10 2014 213 925 |
| Jul. 17, 2014 | (DE) | 10 2014 213 927 |
| Jul. 22, 2014 | (DE) | 10 2014 214 196 |

(52) U.S. Cl.
CPC ............ *F16D 2500/10412* (2013.01); *F16D 2500/304* (2013.01); *F16D 2500/306* (2013.01); *F16D 2500/308* (2013.01); *F16D 2500/3042* (2013.01); *F16D 2500/30426* (2013.01); *F16D 2500/30806* (2013.01); *F16D 2500/30816* (2013.01); *F16D 2500/3107* (2013.01); *F16D 2500/3125* (2013.01); *F16D 2500/3127* (2013.01); *F16D 2500/3163* (2013.01); *F16D 2500/3168* (2013.01); *F16D 2500/50287* (2013.01); *F16D 2500/50293* (2013.01); *F16D 2500/708* (2013.01); *F16D 2500/7044* (2013.01); *F16D 2500/7061* (2013.01); *F16D 2500/7082* (2013.01); *F16D 2500/70605* (2013.01); *F16D 2500/70668* (2013.01); *F16D 2500/70673* (2013.01); *F16D 2500/7109* (2013.01)

(58) Field of Classification Search
CPC . F16D 2500/70668; F16D 2500/70673; F16D 2500/7082
See application file for complete search history.

(56) References Cited

U.S. PATENT DOCUMENTS

| | | |
|---|---|---|
| 6,577,908 B1 | 6/2003 | Wojsznis et al. |
| 2010/0046333 A1* | 2/2010 | Mori .................. G11B 7/00736 369/47.1 |
| 2010/0185379 A1* | 7/2010 | Burkhardt .......... F02D 41/1495 701/103 |
| 2015/0060230 A1 | 3/2015 | Neuberth et al. |

FOREIGN PATENT DOCUMENTS

| | | |
|---|---|---|
| DE | 10254392 | 5/2004 |
| DE | 102008052058 | 11/2009 |
| DE | 202012217132 | 4/2013 |
| DE | 102013204698 | 10/2013 |
| EP | 1630628 | 3/2006 |
| WO | 0198845 | 12/2001 |

* cited by examiner

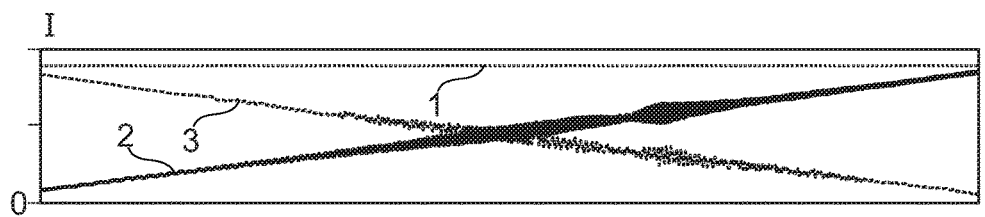
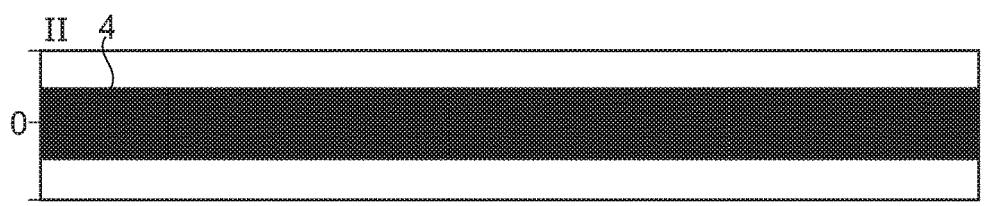
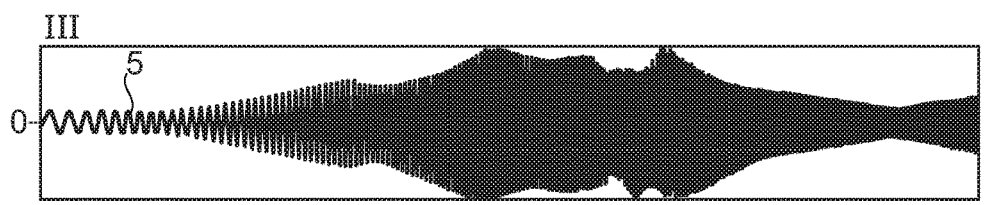
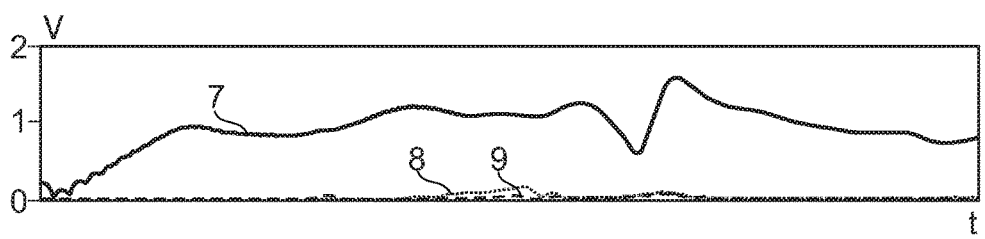

METHOD FOR REDUCING LOW-FREQUENCY VIBRATIONS IN THE DRIVE TRAIN OF A MOTOR VEHICLE

BACKGROUND

The invention relates to a method for reducing chatter vibrations of a friction clutch controlled automatically by a clutch actuator on the basis of a target clutch torque assigned to a clutch torque which is to be transmitted, which clutch is positioned in a drivetrain of a motor vehicle between an internal combustion engine and a transmission, having a present actual clutch torque which is marked by vibrations as a result of chatter vibrations which occur occasionally. Automated friction clutches in a drivetrain of a motor vehicle between an internal combustion engine and a transmission have long been known. Here, instead of the foot of a driver, a clutch actuator controlled by a clutch device moves an actuating element, for example a clutch lever, a diaphragm spring, a lever spring or the like, along an actuation path. Assigned to the actuation path is a torque characteristic curve which is adaptable, for example, to external conditions such as clutch temperature, the frictional properties of the clutch linings, operation time and the like, and which may be calibrated by means of a contact point on the actuation path. For example, depending on the operating situation of the friction clutch desired by the driver or resulting from a transmission controller, a target clutch torque or a value connected therewith is ascertained by a control unit and issued as a control variable to adjust an actuation path of the clutch actuator corresponding to the target clutch torque. Depending on the design of the clutch actuator, when the clutch actuator is driven electrically this variable may be an electrical variable such as voltage, current or pulse width of a supply voltage, or a pressure, a volume flow or the like in the case of a hydraulically or pneumatically operated clutch actuator. The adjustment of the actuation path may be monitored or regulated by means of relative and/or absolute distance sensors.

In friction clutches of this sort, due to the geometric properties and manufacturing tolerances not corresponding to the ideal state, for example angle and axis offsets between the friction elements of the friction clutch resulting in uneven frictional engagement, so-called chatter vibrations may occur, in which case a disturbance clutch torque having a predetermined amplitude and frequency is superimposed on the clutch torque adjusted on the basis of the predetermined target clutch torque, which may result in disruptions of comfort of the motor vehicle and increased wear. To reduce such chatter vibrations, a method is known for example from DE 10 2012 217 132 A1 in which the frequency, amplitude and phase of a vibration superimposed on the transmission input signal is ascertained. In this method, depending on the frequency ascertained, an amplified and phase-shifted signal of the same frequency is generated and modulated as a control signal onto the target clutch torque, so as to eliminate oscillations of the transmission input signal. When multiple frequency components occur with comparable amplitude in the ascertained range, this compensation can result in behavior that is difficult to track. If, in addition, a phase jump occurs in the transmission input signal, frequency is difficult to determine; the same is true in the case of greatly changing amplitude or frequency, since modulations of amplitude, phase and frequency are interconnected.

In DE 10 2013 204 698 A1, a method is disclosed for damping drivetrain vibrations in a general form by eliminating a resonant frequency. This method provides only a limited possibility of reducing the chatter vibrations due to geometry. It is true that known excitation frequencies can be varied by adjusting filter parameters in order to perform an optimization for this excitation, but other excitation frequencies can be intensified thereby; for example, a chattering caused by geometry in a different frequency may be promoted.

From unpublished German patent application no. 10 2013 206 446.2 a method is known for reducing chatter vibrations of a friction clutch positioned in a drivetrain of a motor vehicle between an internal combustion engine and a transmission, which is controlled automatically by a clutch actuator on the basis of target clutch torque assigned to a clutch torque that is to be transmitted. In this case, chatter vibrations overlying a present actual clutch torque are corrected by ascertaining from a transmission behavior of the present actual clutch torque an amplitude and a phase of an input signal obtained at the output of the friction clutch and conveyed to a regulator, ascertaining from these parameters a phase-selective disturbance torque, ascertaining from the latter a phase-correct correction torque, and with this correcting the target clutch torque by means of a regulator which regulates the present actual clutch torque using the correction torque.

SUMMARY

The object of the invention is to advantageously refine such a method, in particular for separating a plurality of vibration components which correlate with one another.

The object is fulfilled by one or more features of the invention. Preferred embodiments of the invention are described below and in the claims.

The proposed method serves to reduce occasionally occurring vibrations, for example vibrations which occur when controlling an electric machine and in particular chatter vibrations of a unit controlled automatically by an actuator, in particular a clutch actuator, on the basis of a target torque assigned to a clutch torque that is to be transmitted, in particular a target clutch torque, in particular a unit located in a drivetrain of a motor vehicle between a combustion engine and a transmission, in particular a friction clutch having an actual present clutch torque which is marked by vibrations as a result of occasionally occurring vibrations, wherein from an input signal which is representative of the vibration-marked torque on the basis of a known transfer behavior of the actual present torque vibration components of known form with unknown prefactors are continuously ascertained, a phase-correct correction torque is determined from these, and the target torque is corrected using the latter. Improved resolution and separation of individual vibration components, for example vibration components that correlate with each other, is achieved by basing the input signal on an estimation model and by means of the estimation model determining the prefactors on the basis of a recursive method of the smallest square errors.

According to a preferred embodiment, to achieve an adaptation to target torques which change over time, measured values are obtained continuously for specified scanning times of the input signal, and newer measurements are weighted relative to older measurements when determining the prefactors.

The estimation model can be made up of a constant component and a component which rises linearly over time. Alternatively, the estimation model may be based on a progression of rotation speed over time, for example the progression of an engine speed, the progression of the transmission input speed, a slip speed of the friction clutch and/or the like for the input value. In this case, for example from a target clutch torque model, depending on the transfer behavior the target clutch torque is made the basis of a driving strategy which outputs this target clutch torque that is to be specified, so that when the transfer behavior is known, the corresponding rotation speed progression can be taken therefrom as the basis in the case where there is no disturbance from the vibration components, and the vibrations that occur can be identified in comparison to the undisturbed rotation speed progression.

In this case, every expected vibration component can be identified by means of a first sinusoidal function whose phase changes continuously with the frequency of the expected vibration component and by means of a second sinusoidal function whose phase is shifted by 90° relative to the phase of the first sinusoidal function. It is possible from the observed measurements to add to each first sinusoidal function a vibration vector with amplitude and phase information for each vibration component, which serves as a prefactor.

In this case, to identify a vibration vector, from the signal progression a scalar product of functions, for example the measurement signal and a sinusoidal function, may be formed, which may also be referred to as an (orthogonal) projection. In this case, the scalar product with a sinusoidal function corresponds to a projection onto a standardized vibration vector in the y axis. If the signal being analyzed consists, for example, of a cosine function whose phase is offset by 90° from the sinusoidal function, then the result is zero, although a finite amplitude and matching frequency are present. For a complete description of the vibration vector a second component is therefore necessary, for example its amplitude or its phase, a complex number or a vector. By choosing a sinusoidal and cosine function, a coordinate system and reference system can be made available. Within this reference system it is possible to describe rotation speed progression, disturbance torque and correction torque as vectors.

In such a reference system it is possible here to describe a phase-correct disturbance torque and a phase-correct correction torque, independent of a frequency response of the transfer behavior.

Furthermore, it is possible in the estimation model to take account of operating variables of the motor vehicle, in particular the vehicle mass, a roadway gradient, a transmission ratio, a clutch torque model derived by means of the driving strategy, and/or the like.

In other words, the proposed method relates to an advantageous refinement of the method contained in the unpublished German patent application no. 10 2013 206 446.2, which is hereby incorporated in its entirety into the present application. The invention is a software strategy which determines the individual excitation frequencies with amplitude and phase information when vibration excitation is forced by a superimposition of a plurality of known frequencies. It should also be capable of running in a typical control device, as used for example for a mechatronically actuated friction clutch. The primary intended use is the identification of geometrically elicited clutch torque fluctuations from a transmission input speed signal, in order to lessen their effects by means of a corresponding counter-activation by a mechatronic friction clutch. The method may also be provided for other similar problems however, for example when actuating electric machines.

The starting point here is a method for reducing geometrically induced clutch torque fluctuations having known excitation frequencies. The method identifies a plurality of possible excitation frequencies independently of one another. A rotation speed vibration is also assigned to a torque vibration by means of an inverse transfer function. The identification corresponds to an observation of a plurality of time-limited vibrations of different frequencies. The underlying functions are therefore not orthogonal. This leads to the result, for example, that a vibration component may be assigned to one frequency and its observation may (also) be assigned to another frequency, so that apparent vibration components are also present in this other frequency, since the signals correlate with each other.

The time-dependent course of the observed rotation speed signal can be broken down into a sum of a plurality of components. The form of these vibration components is known, except for a slowly changeable prefactor (assumed to be constant over a specified time period). Unknown components are ignored as "background noise." The method makes use of the statistical properties of a multiple linear regression, provided, for example, for each vibration component, in order to obtain an optimal parameter estimation of the prefactors according to the least square error. Since a conventional linear regression has proven disadvantageous in real time applications because of heavy demands on the processor or long processor running times, the proposed method is carried out in a preferred manner by means of recursive methods. For example, the procedure is carried out using the RLS method (recursive least squares estimation).

To allow for a possible change in the identified prefactors over time, a so-called exponential forgetting can be provided, which corresponds to greater weighting of the newer measurements.

For a sufficiently good estimation of the prefactors, an advantageous estimation model is proposed which contains a constant component (=1) of the present speed which can be expected without forced vibration excitation, and a component which rises linearly over time, which takes into account the vehicle acceleration that can be expected without forced vibration excitation.

To identify the individual vibration components on the basis of torque, a sinusoidal function is used in each case whose phase changes continuously with the frequency of the corresponding expected excitation; that is, the frequency is the time derivative of the phase. In addition, another sinusoidal function is used which is phase-shifted by 90° from the above, so that a vibration vector with amplitudes and phase information in reference to the excitation frequency in the sense of a "pointer depiction" of one vibration results from the parameters estimated therefrom. In order to determine, for example, a clutch torque vibration from the observation, for example of a rotation speed vibration, a known corresponding frequency pattern, for example, in the form of an amplitude ratio, a phase delay and the like can be applied directly as a prefactor and phase offset to the corresponding sinusoidal function, depending on the excitation frequency. When the right frequency pattern is used, a torque vibration vector can be calculated directly with it, which would be necessary in order to generate the observed torsional vibration or to extinguish it by means of the phase-shifted sinusoidal function.

In another preferred embodiment, to refine the method the constant and linearly rising components of the estimation model named above can be replaced or extended by a model that ascertains the expected rotation speed progression from the clutch torque model of the driving strategy, where this clutch torque model contains no chatter excitation. In this way, it is possible to calculate an expected acceleration of the vehicle for example from a vehicle mass, a roadway gradient, a transmission ratio and a modeled clutch torque and the like contained in the clutch torque model.

With the estimated prefactors obtained in this way, it is possible to operate a controller, for example a PI controller corresponding to German patent application no. 10 2013 206 446.2.

BRIEF DESCRIPTION OF THE DRAWINGS

The invention will be explained in further detail on the basis of the single FIGURE, which shows signal patterns that are measured and corrected.

DETAILED DESCRIPTION OF THE PREFERRED EMBODIMENTS

The FIGURE shows simulated signal patterns 1 through 9 over time t during a creeping process of the motor vehicle with the clutch slipping and slowly engaging, with a complex transfer behavior between clutch torque and transmission input speed. The simulation shows a geometric excitation having an amplitude of one Newton meter, which vibrates with the frequency of the transmission input speed, for example 120 rpm corresponding to an excitation of 2 Hz. Signal pattern 1 in sub-diagram I corresponds to the engine speed of the combustion engine, signal 2 to the transmission input speed and signal 3 to the slip speed of the friction clutch. To identify the prefactors of the vibration components, besides a constant offset and a rise in the estimation model used, the excitation of the combustion engine depicted in signal pattern 4 is specified in sub-diagram II, the excitation of the transmission input speed in signal pattern 5 in sub-diagram III and the excitation of the slip speed in signal pattern 6 in sub-diagram IV. Besides the depicted signal patterns, the unshown corresponding patterns shifted by 90° are also employed for the identification of the prefactors. The signal patterns produced contain in addition a corresponding frequency response, a constant amplitude and a constant phase being formed only in the case of signal pattern 4, since the engine speed is largely constant. Because of the continuous frequency pattern, signal patterns 5, 6 have the character of the stored frequency response.

Sub-diagram V depicts signal patterns 7, 8, 9, with signal pattern 7 reproducing the identified amplitudes of the excitation of the transmission input speed, signal pattern 8 the identified amplitudes of the excitation of the slip speed and signal pattern 9 the identified amplitudes of the excitation of the engine speed. The excitation amplitude of 1 Nm imprinted on the simulation is identified essentially in signal pattern 7. Fluctuations that occur are attributable to the inadequately modeled complex frequency response, which is based on a gradually linearized characteristic curve of the friction clutch. Advantageously, crosstalk onto the signal patterns 8, 9 is essentially absent, although the analysis frequencies come very close and even intersect, and in particular at the crossing points of two frequencies the identified amplitudes are practically the same. This, along with the significantly more stable signal patterns 7, 8, 9 overall, signifies the greatest advantage of the proposed method.

REFERENCE LABELS

1 signal pattern
2 signal pattern
3 signal pattern
4 signal pattern
5 signal pattern
6 signal pattern
7 signal pattern
8 signal pattern
9 signal pattern
I sub-diagram
II sub-diagram
III sub-diagram
IV sub-diagram
V sub-diagram
t time

The invention claimed is:

1. A method for reducing occasionally occurring vibrations of a unit controlled automatically by an actuator based on a target torque assigned to a clutch torque that is to be transmitted, comprising from an input signal which is representative of a vibration-marked torque on the basis of a known transfer behavior of an actual present torque, continuously ascertaining vibration components of known form with unknown prefactors, determining a phase-correct correction torque from the vibration components of known form with unknown prefactors, and correcting the target torque using the phase-correct correction torque, wherein the input signal is based on an estimation model, and the method further comprises determining the prefactors based on a recursive method of smallest square errors.

2. The method according to claim 1, wherein measurements are obtained continuously at specified scanning times of the input signal and newer measurements are weighted relative to older measurements when determining the prefactors.

3. The method according to claim 1, wherein the estimation model is made up of a constant component and a component that rises linearly over time.

4. The method according to claim 1, wherein the estimation model is based on a rotation speed progression, which from a target clutch torque model underlies a driving strategy, depending on the transfer behavior.

5. The method according to claim 1, further comprising identifying every expected vibration component by a first sinusoidal function whose phase changes continuously with the frequency of the expected vibration component and by a second sinusoidal function whose phase is shifted by 90° relative to the phase of the first sinusoidal function.

6. The method according to claim 5, further comprising adding a vibration vector with amplitude and phase information for each vibration component, which serves as a prefactor, to each said first sinusoidal function.

7. The method according to claim 5, wherein a reference system for the vibration components is depicted by the first sinusoidal function.

8. The method according to claim 5, further comprising determining the phase-correct correction torque depending on a frequency response of the transfer behavior.

9. The method according to claim 5, further comprising determining a phase-correct disturbance torque depending on a frequency response of the transfer behavior.

10. The method according to claim 1, wherein the actuator is a clutch actuator, and the unit is located in a drivetrain of a motor vehicle between a combustion engine and a transmission, and operating variables of the motor vehicle, including at least one of a vehicle mass, a roadway gradient, a transmission ratio, or a clutch torque model derived by a driving strategy are taken into account in the estimation model.

* * * * *